United States Patent Office 3,493,833
Patented Feb. 3, 1970

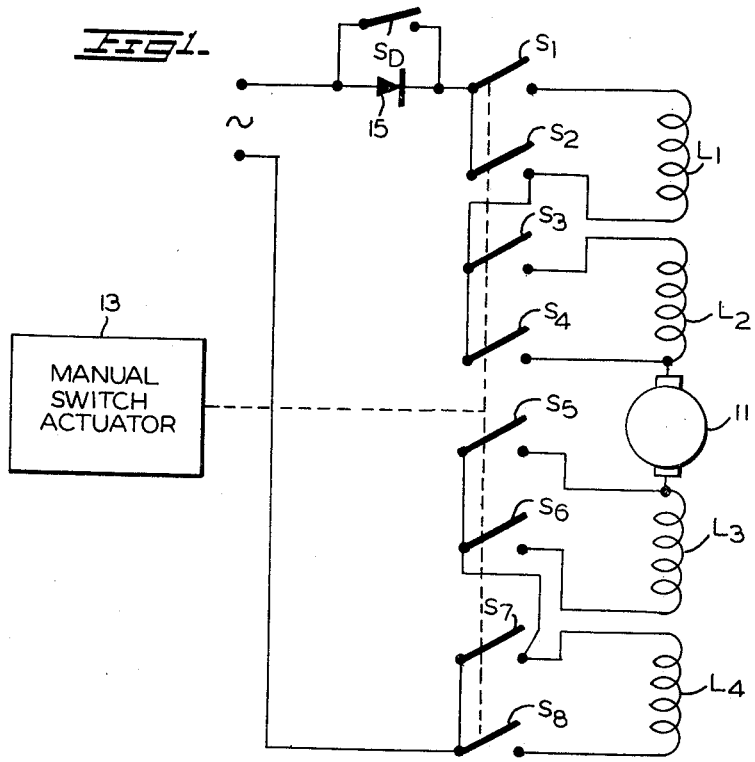

3,493,833
ELECTRIC MOTOR SPEED CONTROL
Roy L. Swanke, Newington, Conn., assignor to Dynamics Corporation of America, New York, N.Y., a corporation of New York
Filed May 5, 1967, Ser. No. 636,457
Int. Cl. H02p 7/10; A02k 23/08
U.S. Cl. 318—252       6 Claims

ABSTRACT OF THE DISCLOSURE

A speed control system for a universal motor having a plurality of field coils on either side of the armature. Switching means are provided for connecting the individual field coils in various series connected combinations. The field coils have differing resistances so that each combination provides a different impedance in the field winding.

---

This invention relates generally to a speed control system for electric motors and more specifically to a speed control system for a universal electric motor for use with mixing and blending devices.

Mixing and blending devices such as the Waring Blendor have become a standard appliance in homes today and have been continually improved for various additional usages. This is particularly true of blending devices wherein high speeds are used for short periods of time. In order to increase the versatility of this type of device, variable speed motors are used so that different items may be blended in varying degrees according to the particular consistency of the item and the ultimate consistency of the product produced.

Most of these devices use a universal A.C./D.C. motor due to the size and economy of such a motor in this particular type of blender.

When a universal motor is to be used for a fairly large number of speeds, a large number of field taps are normally required together with special brushes to avoid rapid brush deterioration when the motor is operated under D.C. conditions.

Accordingly, it is an object of this invention to provide a multiple speed universal motor for blenders which reduces the number of field taps required and substantially eliminates the need for special brushes to prevent brush deterioration. The economy of such a motor will be obvious.

These and other objects will be obvious from the following description when taken in conjunction with the drawings wherein:

FIG. 1 is an electrical schematic of one representative circuit used in the present invention, and FIG. 2 is a chart showing the various switch positions as related to the manual control position.

Turning now more specifically to FIG. 1, there is shown schematically a universal motor 11 which includes a standard armature (not shown) and a series of field coil windings L1, L2, L3 and L4.

As shown, a group of ganged switches S1 through S8 are coupled between a power source and the field coil windings. These switches may be controlled by a manual switch actuator 13 which may be any of the well-known type of actuators, such as a pushbutton switch or a rotary switch. The major requirement of the switch is that each position closes a certain group of switches and maintains the other switches in an open condition.

Also interconnected between the power source and the field coil windings is a diode 15 and a further switch $S_D$ which bypasses the diode when closed.

The basic purpose of having a plurality of field coil windings is to provide various combinations of series-connected windings which may be placed in the completed circuit across the armature so as to provide varied impedances depending upon the particular combination used. There are a number of ways in which the impedance of the windings could be varied. However, the preferred means comprises varying impedances to adjust the total resistance involved in the various combinations of elements which are placed across the armature. A specific embodiment involves the use of different gauge wires for the particular coils. In this situation, the number of turns of each one of the separate field windings may be identical. This system is preferred because of the economy of manufacture over other ways of changing the impedance such as by adding differing resistors in series with each of the coils or by changing the number of turns of the coils. The latter method also involves other factors which makes it more difficult to determine exact speed due to the varying ampere-turn relationship of the wire.

As one example of a successfully operated motor, the parameters as shown include an armature using a twelve segment commutator having 44 turns of No. 28 gauge wire in each of the coils. Field coils L2 and L3 both consist of 110 turns of No. 23 gauge wire with field coil L1 being No. 28 gauge wire and field coil L4 being No. 31 gauge wire.

FIG. 2 relates the various positions of each of the switches S1 through S8 when the manual switch actuator 13 is in the position shown. It will be noted that with the switch $S_D$ closed and the diode 15 bypassed there will be a combination of eight possible switch positions using various coil combinations. With the switch $S_D$ open, the same combination of switch coils will produce a different motor speed since the diode restricts the motor to half-cycle operation.

The following chart shows which coils are connected in series across the armature for the various switch positions:

| Manual switch actuator position: | Coils |
|---|---|
| 1 | L1, L2, L3, L4 |
| 2 | L1, L3, L4 |
| 3 | L2, L3, L4 |
| 4 | L1, L2, L3 |
| 5 | L1, L4 |
| 6 | L2, L4 |
| 7 | L1, L3 |
| 8 | L2, L3 |

It will be noted that with the above-mentioned parameters, the total resistance decreases as the switch position proceeds from position 1 to position 8. Accordingly, the speed of the motor will increase proportionately. The lower set of speeds occur with switch $S_D$ open so that the current passes through diode 15.

It will be obvious from the above description that a simplified system for obtaining a large number of fixed speeds has been made available in a very economical manner. The economics of this invention can best be seen when compared with a tappered field winding. In the use of a tapped field winding it is necessary to bring a separate tap out for each speed. By the use of the switching arrangement described herein, it is possible to obtain 16 speeds through the use of combinations of field coils all of which are in series with no parallel field coil operation. Additionally, the use of the diode 15 on the lower speeds permits the motor to deliver a higher torque than would be possible at that same speed with full wave A.C. operation. Accordingly, it may be seen that there are both performance and economic advantages to be realized from the use of the present invention.

Essentially, the motor as described is a two-tapped field motor with one tap on each side of the field being brought out.

Although the speed control system of the present invention is particularly adapted for use with universal electric motors for mixing and blending devices, it is, of course, capable of use with electric motors for any other purpose.

It is to be understood that the above description and accompanying drawings are illustrative only since the particular components and particular combination of coils could be varied in accordance with the desired operation. Therefore, the invention is to be limited only by the scope of the following claims.

1. A speed control for a universal electric motor connected across a source of alternating current comprising:
   an armature,
   a pair of field coil windings on either side of said armature, said field coils having differing impedances,
   a plurality of single throw variable switch means for selectively connecting said field coil windings to said source in differing combinations of series configurations so that the impedance of the combination of coils changes with each switch position, at least one coil of each pair of said field coil windings having two single throw switches alternately connecting to the other coil, and the other coil of each pair of said coils having at least one single throw switch for bypassing itself.

2. The speed control of claim 1 further comprising:
   a rectifier, and
   switch means for selectively connecting said rectifier between said switches and said source of alternating current.

3. The speed control of claim 1 wherein each coil contains the same number of windings and the impedance is changed by using different gauge wire for various windings.

4. A speed control system for a universal electric motor connectable to an alternating current source comprising:
   an armature,
   a pair of field coils of differing impedances connected to either side of said armature,
   a plurality of single throw switches coupled to said alternating current source,
   means for selectively connecting said plurality of switches to said coils so as to provide differing combinations of series connected coils across said armature,
   at least one coil of each pair of said field coil windings having two single throw switches alternately connecting to the other coil, and
   the other coil of each pair of said coils having at least one single throw switch for bypassing itself.

5. The speed control system of claim 4 further comprising:
   a rectifier, and
   means for selectively connecting said rectifier between said plurality of switches and said alternating current source.

6. The speed control system of claim 4 further comprising:
   means connectable between said switches and said current source for selectively limiting said alternating current source to half cycles thereof.

References Cited
UNITED STATES PATENTS

| | | | |
|---|---|---|---|
| 2,923,873 | 2/1960 | Annis | 310—184 |
| 3,283,227 | 11/1966 | Ulinski | 318—252 |
| 3,286,150 | 11/1966 | Wilson et al. | 318—252 |

FOREIGN PATENTS 236,546   1/1960   Australia.

ORIS L. RADER, Primary Examiner

K. L. CROSSON, Assistant Examiner

U.S. Cl. X.R.

318—353, 523